United States Patent [19]
Moskovich

[11] Patent Number: 5,329,363
[45] Date of Patent: Jul. 12, 1994

[54] PROJECTION LENS SYSTEMS HAVING REDUCED SPHEROCHROMATISM

[75] Inventor: Jacob Moskovich, Cincinnati, Ohio

[73] Assignee: U. S. Precision Lens Incorporated, Cincinnati, Ohio

[21] Appl. No.: 77,418

[22] Filed: Jun. 15, 1993

[51] Int. Cl.⁵ .............................................. H04N 9/31
[52] U.S. Cl. ................................. 348/781; 359/649; 359/642
[58] Field of Search .............. 359/648, 649, 642, 565, 359/797, 731, 733, 650-651; 358/60, 64, 231, 237; H04N 9/31, 5/74

[56] References Cited

U.S. PATENT DOCUMENTS

| | | | |
|---|---|---|---|
| 4,178,075 | 12/1979 | Rogers | 359/733 |
| 4,300,817 | 11/1981 | Betensky | 359/651 |
| 4,329,024 | 5/1982 | Rogers | 359/733 |
| 4,348,081 | 9/1982 | Betensky | 359/651 |
| 4,526,442 | 7/1985 | Betensky | 359/651 |
| 4,682,862 | 7/1987 | Moskovich | 359/649 |
| 4,697,892 | 10/1987 | Betensky | 359/650 |
| 4,755,028 | 7/1988 | Moskovich | 359/650 |
| 4,776,681 | 10/1989 | Moskovich | 359/649 |
| 4,815,831 | 3/1989 | Betensky | 359/649 |
| 4,900,139 | 2/1990 | Kreitzer | 359/649 |
| 4,963,007 | 10/1990 | Moskovich | 359/649 |
| 5,055,922 | 10/1991 | Wessling | 358/60 |

OTHER PUBLICATIONS

The Handbook of Plastic Optics, U.S. Precision Lens, Inc., Cincinnati, Ohio, 1983, pp. 17-29.

Primary Examiner—James J. Groody
Assistant Examiner—Glenton B. Burgess
Attorney, Agent, or Firm—Maurice M. Klee

[57] ABSTRACT

A projection lens system for projecting an image from a cathode ray tube (CRT) onto a screen is provided. The spherochromatic aberration of the system is reduced through the use of a first lens element which has (i) a positive power on axis and at least one aspheric surface which causes the positive power to become negative in the vicinity of the lens element's clear aperture, and (ii) a high dispersion. The first lens element is preferably composed of styrene.

35 Claims, 7 Drawing Sheets

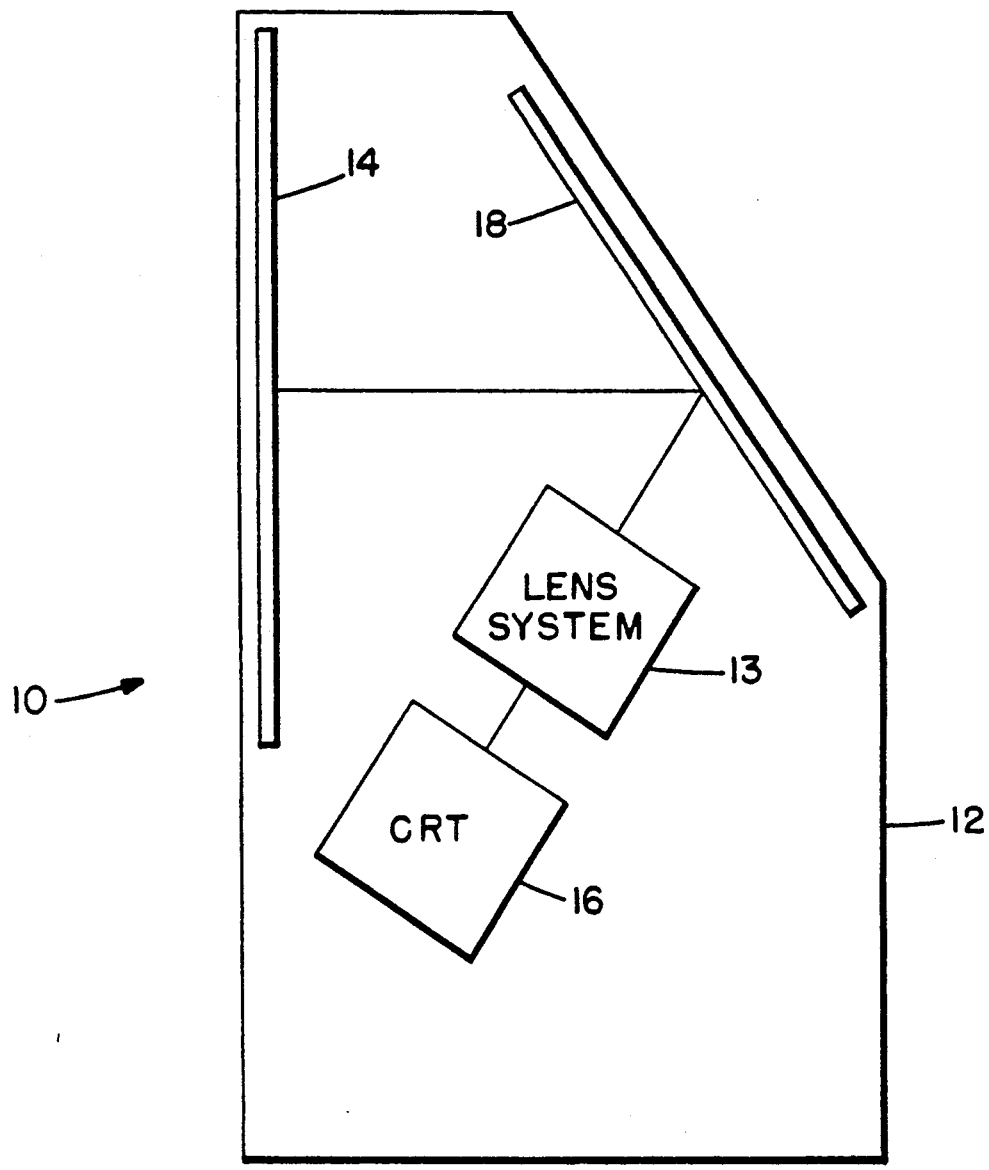

PROJECTION LENS SYSTEMS HAVING REDUCED SPHEROCHROMATISM

BACKGROUND OF THE INVENTION

1. Field of the Invention

This invention relates to projection lens systems for use in projection televisions and, in particular, to improved projection lens systems having reduced spherochromatic aberrations.

2. Description of the Prior Art

Projection lens systems for CRT projection televisions have undergone continuing development during the past fifteen years or so. As a result, many of today's CRT projection televisions are equipped with fast lens systems which provide wide semi-fields of view.

Projection lens systems of this type generally include three lens units, i.e., a "first" or "A" lens unit located on the image side of the lens system of weak power, a "second" or "B" lens unit following the first lens unit of strong positive power, and a include three lens units, i.e., a "first" or "A" lens "third" or "C" lens unit following the second lens unit of strong negative power. See, for example, Betensky, U.S. Pat. Nos. 4,300,817, 4,348,081, and 4,526,442.

To achieve half-angles of view greater than about 28°, a fourth lens unit (referred to herein as the "corrector" or "CR" (unit) is normally added between the strong positive and the strong negative units of the three unit configuration, i.e., between the B and C units. See Betensky, U.S. Pat. No. 4,697,892, and Moskovich, U.S. Pat. Nos. 4,682,862, 4,755,028, and 4,776,681. This additional unit usually does not have much optical power; however, it must have at least one aspherical surface to correct for aperture dependent off-axis aberrations like sagittal oblique spherical and coma.

Color images for projection televisions are normally obtained by combining images from three color CRTs, i.e., a red CRT, a green CRT, and a blue CRT. So that the images from the three CRTs will lie substantially on top of one another at the viewing screen, i.e., to minimize color fringing, projection lens systems used in projection televisions are normally corrected for transverse chromatic aberration, i.e., the variation with wavelength of the height of an image point above the optical axis. Transverse chromatic aberration is also known as the chromatic difference in magnification or simply lateral color. This correction is usually achieved by locating the lens system's stop in the proximity of the B unit, e.g., at the middle of the B unit.

For many applications, the projection lens system does not need to be corrected for longitudinal chromatic aberration, i.e., the variation with wavelength of the location along the optical axis of an axial image point. Longitudinal chromatic aberration is also known as axial chromatic aberration or simply axial color. When not corrected by the lens system, this aberration is dealt with by physically adjusting the location of the lens system and its associated CRT with respect to the screen, i.e., by adjusting the front and back conjugates to compensate for the change in focal length of the lens system with wavelength.

The phosphors used in commercially available CRTs do not emit light at a single wavelength. In particular, green phosphors have significant sidebands in blue and red. Similar polychromaticity exists for red and blue phosphors, but to a lesser extent.

For certain applications, such as, high definition television, data displays, or systems which operate at a high magnification, lens systems which are fully or partially corrected for axial color are needed to avoid visible color fringing and/or loss of image contrast as a result of the color spread of CRTs. See, for example, Betensky, U.S. Pat. No. 4,815,831, Kreitzer, U.S. Pat. No. 4,900,139, and Moskovich, U.S. Pat. No. 4,963,007. Such fully or partially color corrected lens systems, however, are more complex and thus more expensive than non-color corrected systems. Accordingly, these systems are often not used in consumer applications.

Wessling, U.S. Pat. No. 5,055,922, discloses a less expensive approach for addressing the color spread problem. In accordance with this approach a filter material that absorbs at least some of the undesired CRT sidebands is incorporated in one or more elements of the lens system. Although this approach significantly reduces the light intensity in the sidebands, it does not completely eliminate them. Also, the filter material approach does not change the lens system's overall aberration behavior.

In addition to lateral and axial color, lens systems can exhibit an additional wavelength dependent aberration known as spherochromatism. This residual-type aberration involves changes in a lens system's spherical aberration with changes in wavelength. Basic spherical aberration for an uncorrected positive lens causes rays further from the axis to focus closer to the lens than rays closer to the axis.

A well-corrected projection television lens system will generally have little spherical aberration for light having a wavelength of around 546 nanometers, i.e., light in the yellow/green range. However, because of spherochromatism, spherical aberration at other wavelengths is often significant. In particular, spherical aberration will typically be substantially undercorrected over most of the aperture for blue light and substantially overcorrected for red light. As a result, the image produced by the projection lens has less contrast than it would have if these spherochromatic aberrations were not present.

SUMMARY OF THE INVENTION

In view of the foregoing state of the art, it is an object of the present invention to provide improved projection lens systems for use in projection televisions. More particularly, it is an object of the invention to provide projection lens systems which have improved performance at essentially no increase in manufacturing cost. It is a specific object of the invention to provide such improved performance by reducing the spherochromatic aberration of the projection lens system.

To achieve these and other objects, the invention in accordance with certain of its aspects provides a projection lens system for use with a cathode ray tube comprising in order from the system's image side:

(a) a first lens unit comprising in order from the lens system's image side:
  (i) a first lens element having a positive power on axis and at least one aspheric surface which causes said positive power to become negative in the vicinity of the lens element's clear aperture; and
  (ii) a second lens element of weak optical power;
(b) a second lens unit which comprises a third lens element which provides the majority of the lens system's positive optical power, the dispersion of the first lens element being greater than the dispersion of the third lens element; and (c) a third lens unit of negative power which is associated with the cathode ray tube during use of the lens system and which provides most of the correction for the field curvature of the lens system.

In accordance with others of its aspects, the invention provides a projection lens system for use with a cathode ray tube comprising in order from the system's image side:

(a) a first lens unit having a first lens element at its image side which has a positive power on axis and at least one aspheric surface which causes said positive power to become negative in the vicinity of the lens element's clear aperture;

(b) a second lens unit which comprises a power subunit, said power subunit providing the majority of the lens system's positive optical power and comprising at least one positive lens element, the dispersion of said first lens element being greater than the dispersion of said at least one positive lens element of the power subunit, e.g., the first lens element is composed of a high dispersion plastic such as styrene and the lens element or elements making up the power subunit are composed of a crown-type glass, i.e., a low dispersion glass; and (c) a third lens unit of negative power which is associated with the cathode ray tube during use of the lens system and which provides most of the correction for the field curvature of the lens system.

In accordance with further of its aspects, the invention provides a projection lens system for use with a cathode ray tube comprising in order from the system's image side:

(a) a first lens unit having a lens element at its image side composed of a high dispersion plastic material such as styrene;

(b) a second lens unit for providing the majority of the lens system's positive optical power; and (c) a third lens unit of negative power which is associated with the cathode ray tube during use of the lens system and which provides most of the correction for the field curvature of the lens system.

In certain preferred embodiments of the foregoing aspects of the invention, the lens system includes a corrector lens unit having at least one aspheric surface. In further preferred embodiments, the second lens element of the first lens unit, the corrector lens unit, and the third lens unit are all composed of low dispersion materials.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

Figure 1:
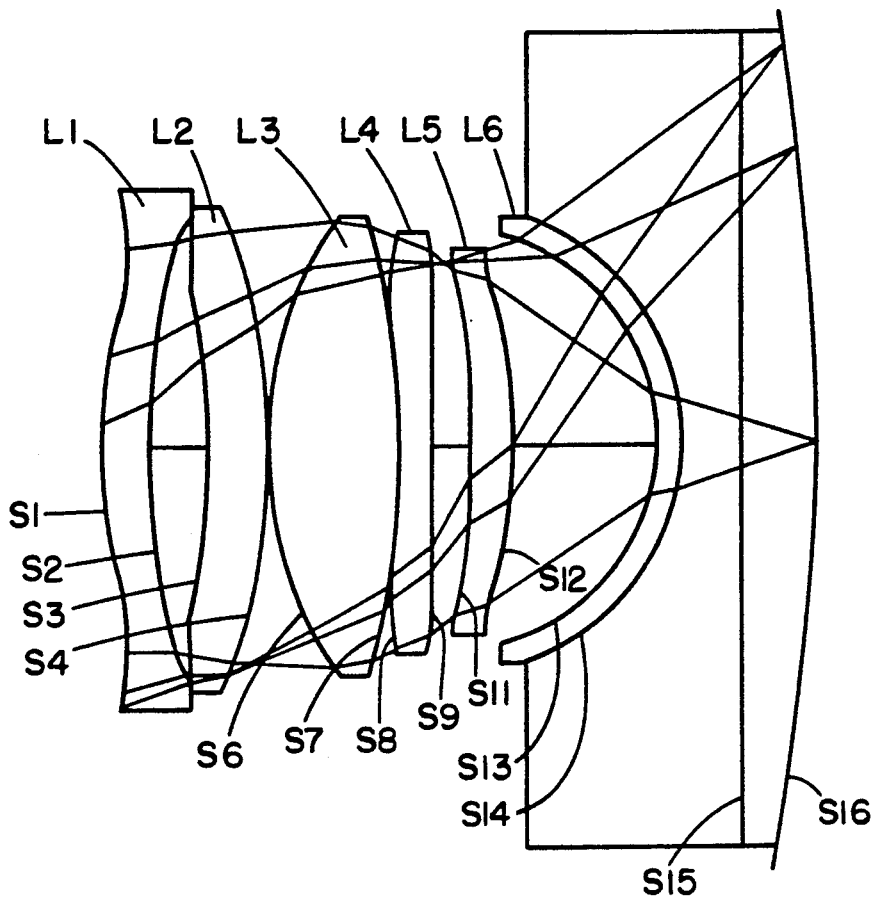
FIGS. 1 through 4 are schematic side views of lens systems constructed in accordance with the invention.

The plots of FIGS. 6 through 10 show the size of the lateral aberrations in the focal plane for yellow/green light (546.1 nanometers). In particular, the height (H') at which various axial rays intersect the focal plane for yellow/green light is plotted versus normalized ray height at the system's entrance pupil for rays traveling from the system's long conjugate to its short conjugate. Each division along the horizontal axis represents 0.1 millimeters with distances above the optical axis being plotted to the right and distances below the optical axis being plotted to the left. The data points shown by circles, triangles, and squares are for light having wavelengths of 546.1, 480.0, and 643.8 nanometers, respectively.

FIG. 11 is a schematic diagram of a rear projection TV employing a lens system constructed in accordance with the invention.

DESCRIPTION OF THE PREFERRED EMBODIMENTS

As discussed above, the lens systems of the present invention preferably include A, B, CR, and C units wherein: 1) the A unit includes first and second lens elements; 2) the first lens element is positive on axis and negative in the vicinity of its clear aperture and is composed a high dispersion material (e.g., styrene); 3) the second lens element has low power and is preferably composed of a low dispersion material (e.g., acrylic); and 4) the B unit includes a third lens element (the "power" element) which is composed of a low dispersion material (e.g., a crown-type glass).

The A unit serves to correct aperture type aberrations including spherical aberration and coma. In particular, the A unit, specifically, the first lens element of the A unit, provides most of the correction for variation in the lens system's spherical aberration with wavelength. As can be seen from the ray tracings of FIGS. 1-4, this unit operates on substantially the entire diameter of the beam of light which passes through the system.

The first lens element of the A unit has a positive optical power on axis and at least one aspheric surface which causes the positive power to become negative in the vicinity of the element's clear aperture. The positive power on axis is preferably relatively weak, e.g., $\phi_1/\phi_0$ is preferably less than about 0.3 where $\phi_1$ is the on-axis power of the first lens element and $\phi_0$ is the overall power of the lens system. The negative power in the vicinity of the first element's clear aperture, on the other hand, is relatively strong, e.g., $|\phi_{CA}|/\phi_1$ is preferably greater than about 8.0 where $|\phi_{CA}|$ is the absolute value of the most negative power of the first lens element in the vicinity of the clear aperture.

The second lens element of the A unit is preferably a meniscus-shaped element which is concave to the first lens element. This element preferably has at least one aspheric surface and is of weak optical power, e.g., $|\phi_2|/\phi_0$ is preferably less than about 0.1 where $|\phi_2|$ is the absolute value of the on-axis power of the second lens element. $\phi_2$ will normally be positive, although in some cases it may be negative. Whether positive or negative on axis, the second lens element is preferably positive in the vicinity of its clear aperture.

The B unit of the lens systems of the invention provides the majority of the lens system's positive optical power. As shown in FIGS. 1-4, this unit is composed of a single positive power element, i.e., element L3. More generally, the B unit includes a power subunit which provides the majority of the lens system's positive optical power and comprises at least one positive lens element. The B unit can also include a color correcting doublet, if desired. Whether composed of a single lens element or multiple lens elements, the elements of the B unit and, in particular, the elements of the power subunit are preferably composed of glass so as to minimize changes in focus with changes in temperature of the lens system.

The CR and C units of the lens systems of the invention serve to correct off-axis aperture dependent aberrations and field dependent aberrations, respectively. In particular, the CR unit is effective in dealing with oblique spherical aberrations, while the C unit is effective in reducing the system's field curvature.

As shown in FIGS. 1-4, the CR unit comprises two aspheric lens elements, i.e., elements L4 and L5. Alternatively, a single aspherical lens element can be used for the CR unit. In either case, the lens elements are preferably composed of plastic and, in particular, are preferably composed of an acrylic plastic.

As also shown in FIGS. 1-4, the C unit is composed of: 1) an aspherical lens element, i.e., element L6; and 2) the fluid which fills the space between and couples the lens system to the faceplate of the CRT. Element L6 is preferably composed of a plastic material and, in particular, is preferably composed of an acrylic plastic. If desired, element L6 can include an absorptive color filter material in accordance with the Wessling patent referred to above, i.e., U.S. Pat. No. 5,055,922. In FIGS. 1-4, the faceplate of the CRT is curved and thus, in accordance with conventional practice, its power is included in calculating the overall properties of the lens system (e.g., $f_0$) and, in particular, the properties of the C unit (e.g., $f_C$).

In order to reduce the spherochromatism of the lens system, the first lens element (L1) of the A unit is composed of a material having a dispersion which is higher than the dispersion of the material making up the power subunit of the B unit, e.g., lens element L3 in FIGS. 1-4. In general, this difference in dispersion is achieved by forming the first lens element from a high dispersion material (i.e., a material having a dispersion like flint glass) and the power subunit from a low dispersion material (i.e., a material having a dispersion like crown glass) where high dispersion materials are those having V-values ranging from 20 to 50 for an index of refraction in the range from 1.85 to 1.5, respectively, and low dispersion materials are those having V-values ranging from 35 to 75 for the same range of indices of refraction.

The difference in dispersion between the first lens element and the power subunit is preferably achieved by making the first lens element out of styrene and the power subunit out of crown-type glass. In place of styrene, other plastics having flint-like dispersions can be used to prepare the first lens element, including polycarbonates and copolymers of polystyrene and acrylic such as NAS. See *The Handbook of Plastic Optics*, U.S. Precision Lens, Inc., Cincinnati, Ohio, 1983, pages 17-29. In addition, the first lens element can be made of a flint-like glass if desired.

The plastic lens elements of a projection lens system for a CRT projection television are typically made of acrylic. Accordingly, in its preferred embodiments, the present invention involves using styrene instead of acrylic for the first lens element. This change in material essentially does not change the manufacturing cost of the lens system. It also does not make the manufacturing process more difficult or complicated since styrene polymers can generally be molded as easily as acrylic polymers. Yet, as shown by the examples presented below, the change from acrylic to styrene for the first lens element significantly reduces the spherochromatism of the lens system and thus improves its performance. The invention thus provides the highly desirable and difficult to achieve benefit of enhanced performance without increased cost.

In order to keep the lens systems of the invention as simple as possible, it is preferred that of the various wavelength dependent aberrations, only spherochromatism and lateral color are corrected. However, if desired, axial color can also be corrected, e.g., by the inclusion of a color correcting doublet in the B unit.

FIGS. 1 to 4 illustrate various lens systems constructed in accordance with the invention. Corresponding prescriptions appear in Tables 1 to 4, respectively. FIG. 5 shows a lens system having a configuration similar to that of FIGS. 1 to 4 but with a first lens element having a low dispersion rather than a high dispersion. Its prescription is set forth in Table 5.

The aspheric coefficients set forth in the tables are for use in the following equation:

$$z = \frac{cy^2}{1 + [1 - (1 + k)c^2y^2]^{\frac{1}{2}}} + ADy^4 + AEy^6 + AFy^8 + AGy^{10} + AHy^{12} + AIy^{14}$$

where z is the surface sag at a distance y from the optical axis of the system, c is the curvature of the lens at the optical axis, and k is a conic constant which is zero for the lens systems of FIGS. 1-5.

The abbreviations used in these tables and in Tables 6 and 7 are as follows: SN—surface number; CLR. AP.—clear aperture; EFL—effective focal length; ZP—zoom position; MAG—magnification; L—lens element number; U—lens unit number; HFOV—half angle field of view; and FINITE f/NO—working (as opposed to infinity) f-number. All dimensions given in the tables are in millimeters. Thickness values represent the distance between the surface with which the thickness value is aligned and the next higher surface number. They thus correspond to either lens thicknesses or lens spacings depending upon the surface number with which the thickness is associated. Surfaces and lens elements are identified by "S" and "L" numbers, respectively, in FIGS. 1-5. As is conventional, powers are simply the inverse of focal lengths.

Surfaces 5 and 10 in Tables 1, 2, and 5 correspond to the location of vignetting apertures (not shown in the figures). Some of these vignetting surfaces are associated with negative lens spacings to indicate that they are located to left of the preceding lens surface in the figures. The zoom spacings set forth in the tables are used to adjust the focus of the lens system to meet the requirements of specific applications.

Summaries of the various properties of the lens systems of FIGS. 1-4 are set forth in Tables 6-7. As shown therein, each of the lens systems has a $\phi_1/\phi_0$ ratio which is less than 0.3, a $|\phi_{CA}|/\phi_1$ ratio which is greater than 8.0, and a $|\phi_2|/\phi_0$ ratio which is less than 0.1.

FIG. 11 is a schematic diagram of a rear projection television 10 constructed in accordance with the invention. As shown in this figure, projection television 10 includes cabinet 12 having projection screen 14 along its front face and slanted mirror 18 along its back face. Module 13 in FIG. 11 schematically illustrates a lens system constructed in accordance with the invention and module 16 illustrates its associated CRT tube. In practice, three lens systems 13 and three CRT tubes 16 are used to project red, green, and blue images onto screen 14.

Without intending to limit it in any manner, the present invention will be more fully described by the following examples.

COMPARATIVE EXAMPLE 1

This example compares the spherical aberration of the lens system of FIG. 1 with the spherical aberration of a lens system having the same lens elements and same indices of refraction but with the first lens element having a low dispersion rather than a high dispersion as in FIG. 1.

Specifically, spherical aberration as a function of wavelength was calculated for: 1) the lens prescription of Table 1; and 2) the lens prescription of Table 1 with a first element composed of a simulated material having an index of refraction of 1.59495, i.e., the index of styrene, and a $V_e$ number of 57.3, i.e., the dispersion of acrylic.

Figure 6A:
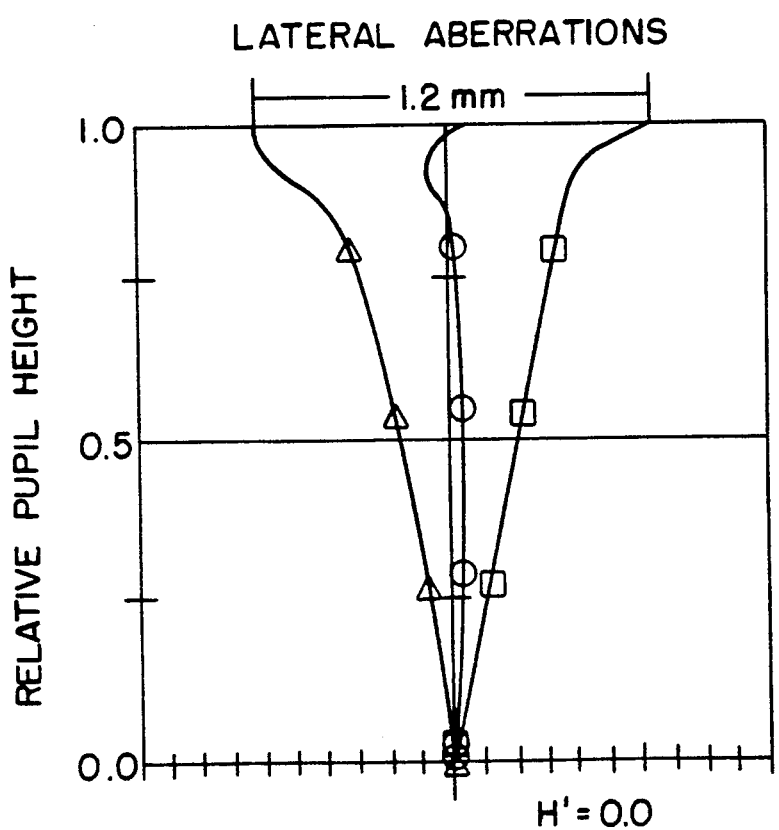
FIGS. 6A and 6B compare the spherical aberration of the lens system of FIG. 1 with the spherical aberration of a lens system having the same lens elements and same indices of refraction but with the first lens element having a low dispersion rather than a high dispersion as in FIG. 1.
Figure 6B:
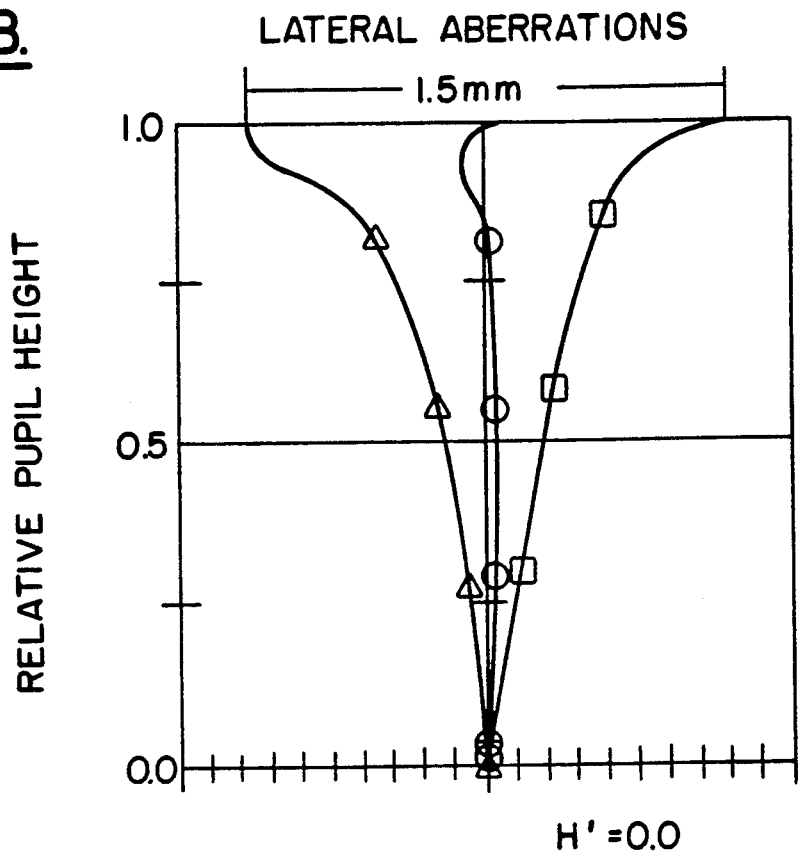

The results of these calculations are shown in FIGS. 6A and 6B, where FIG. 6A shows the spherical aberrations of the Table 1 lens and FIG. 6B shows the spherical aberrations of the Table 1 lens with the low dispersion first lens element. As can be seen in these figures, the variation in H' with aperture for blue and red light (triangle and square data points, respectively) is significantly less in FIG. 6A than in FIG. 6B. In particular, the spread between the red and blue lines at full aperture in FIG. 6A is about 1.2 millimeters while in FIG. 6B it is about 1.5 millimeters. Accordingly, by means of the invention, color blur has been reduced by approximately 20%. In addition, spherical aberration is better controlled for the lens system of the invention as can be seen from the fact that the curves for red and blue light are closer to straight lines in FIG. 6A than in FIG. 6B. Together these results show that the use of a high dispersion material for the first lens element significantly reduces spherochromatism.

COMPARATIVE EXAMPLE 2

This example compares the spherical aberration of the lens system of FIG. 1 with the spherical aberration of a lens system having a similar configuration but with a first lens element composed of acrylic rather than of styrene as in FIG. 1. This comparative lens system was optimized in the same manner as the lens system of FIG. 1. Its configuration and prescription are shown in FIG. 5 and Table 5, respectively.

Figure 7A:
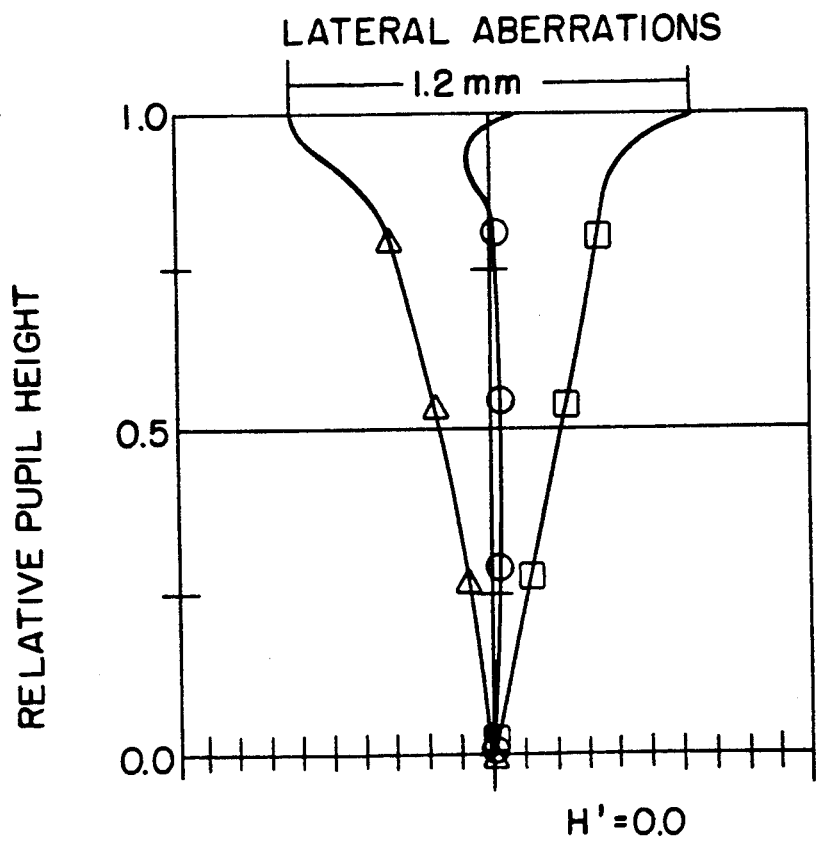
FIGS. 7A and 7B compare the spherical aberration of the lens system of FIG. 1 with the spherical aberration of the lens system of FIG. 5.
Figure 7B:
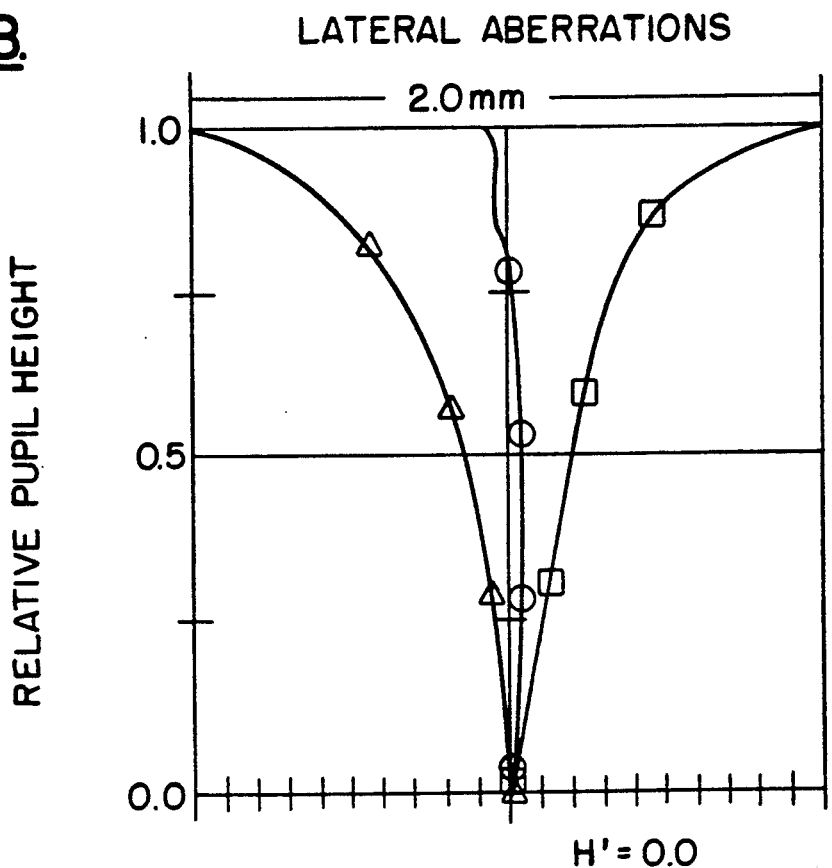

The spherical aberrations of the FIG. 1 and FIG. 5 lens systems are shown in FIGS. 7A and 7B, respectively. As can be seen in these figures, the variation in H' with aperture for blue and red light (triangle and square data points, respectively) is less in FIG. 7A than in FIG. 7B. In particular, the spread between the red and blue lines at full aperture in FIG. 7A is about 1.2 millimeters while in FIG. 7B it is about 2.0 millimeters. Accordingly, by means of the invention, color blur has been reduced by approximately 40%. In addition, the curves for red and blue light are closer to straight lines in FIG. 7A than in FIG. 7B, which means that spherical aberration is better controlled for the lens system of the invention than the lens system of FIG. 5. Together these results again demonstrate the reduced spherochromatism achieved by using a high dispersion first lens element which is positive on axis and negative in vicinity of its clear aperture.

EXAMPLE 3

Figure 2:
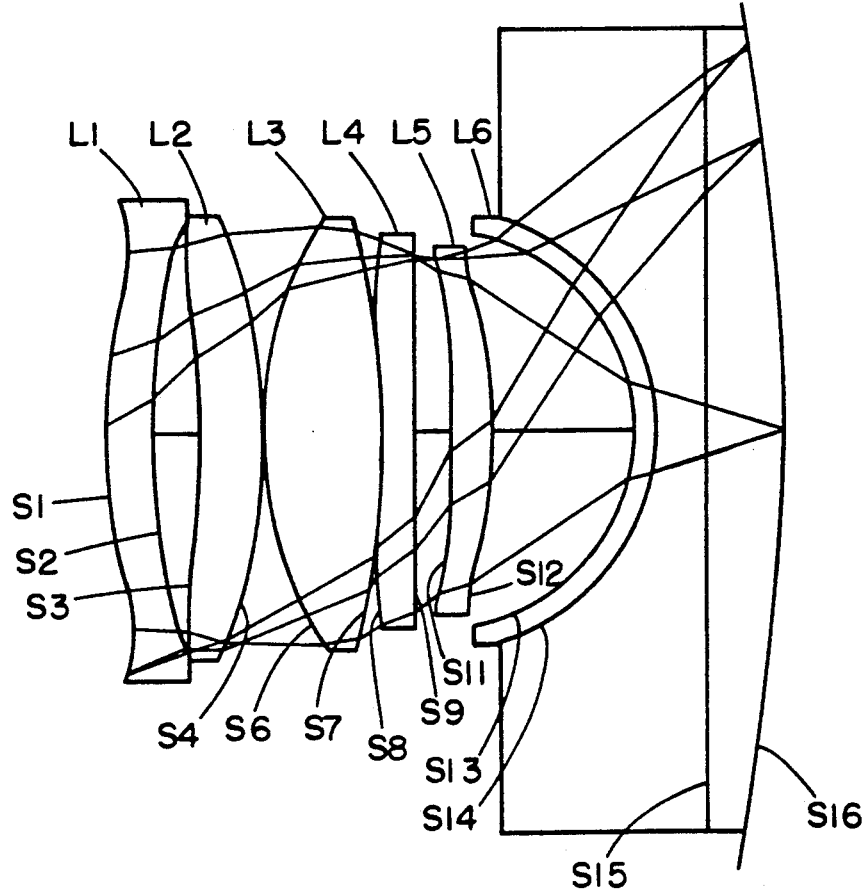
Figure 3:
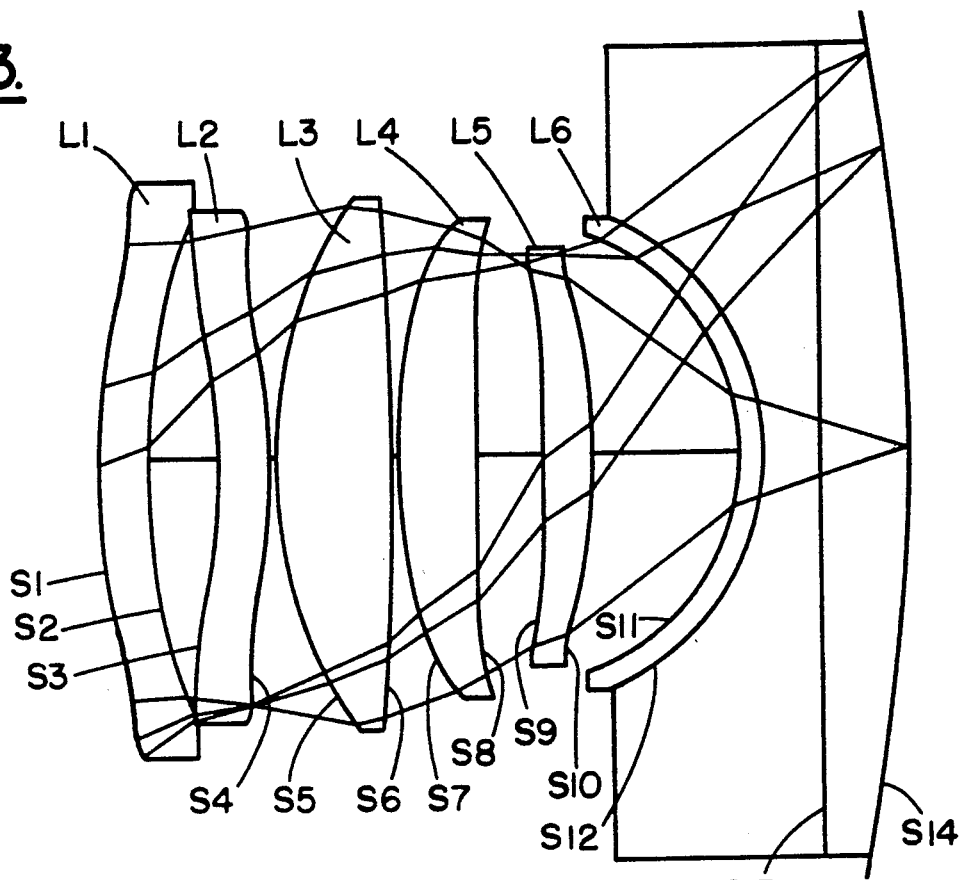
Figure 4:
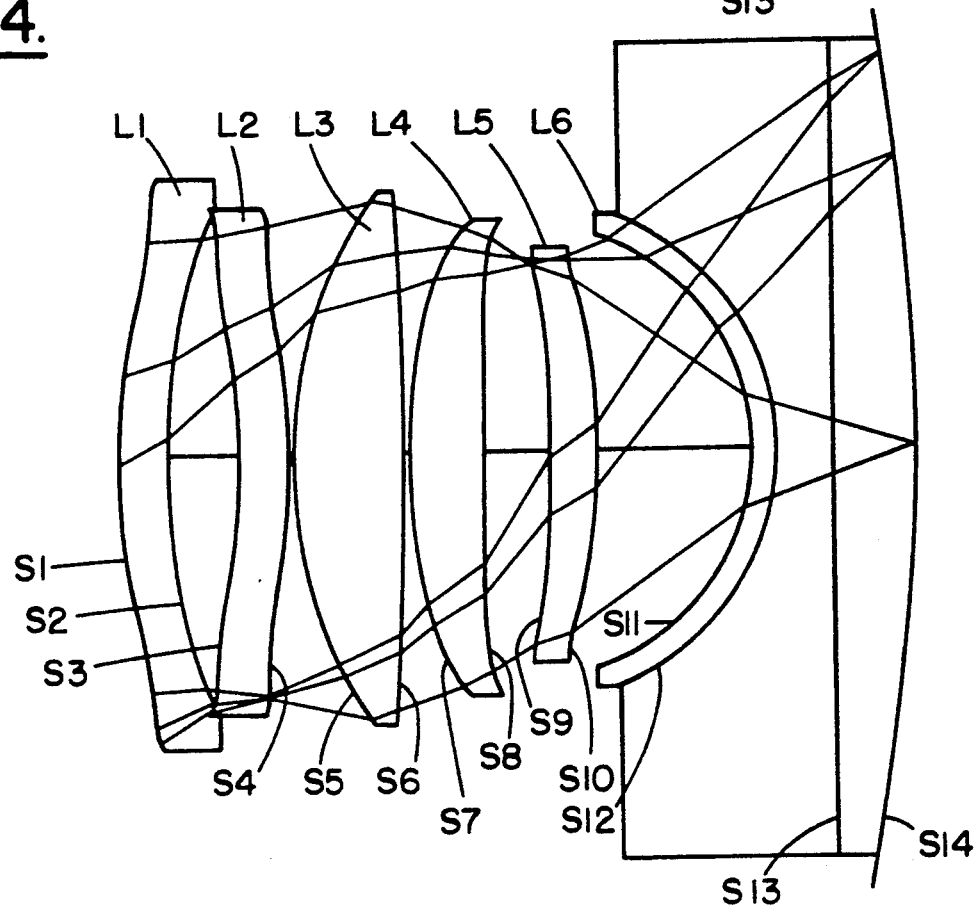
Figure 5:
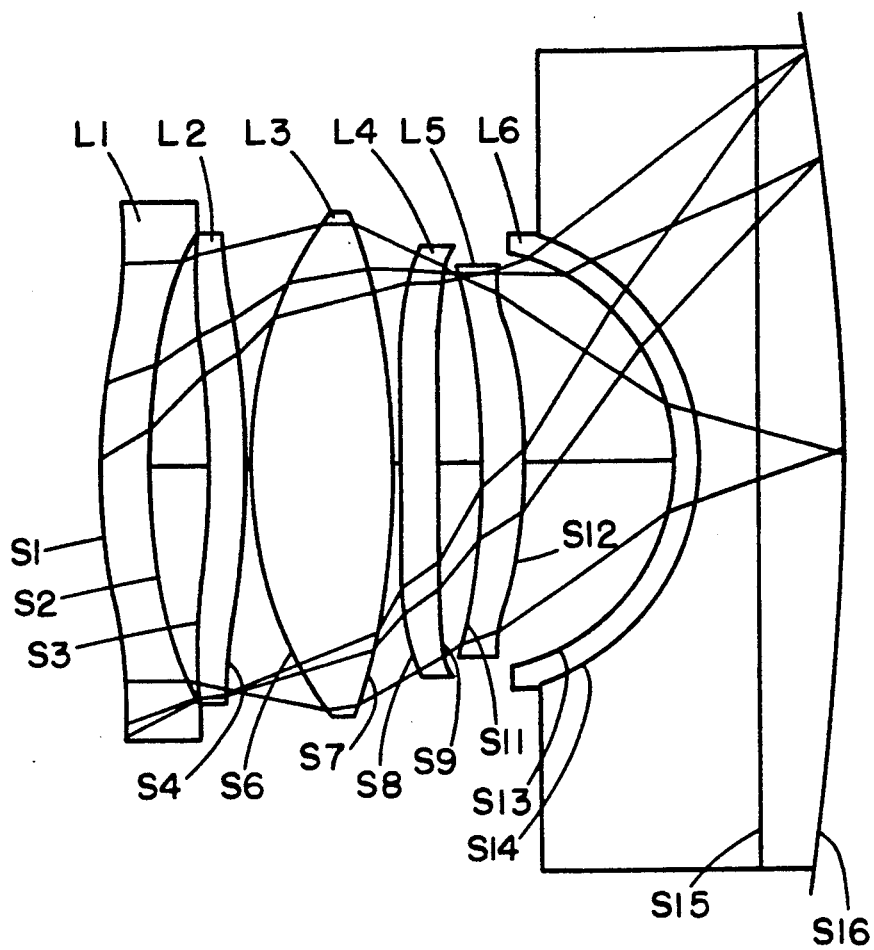
FIG. 5 is a schematic side view of a lens system having a configuration similar to that of the lens systems of FIGS. 1-4 but with a first lens element composed of a low dispersion plastic.
Figure 8:
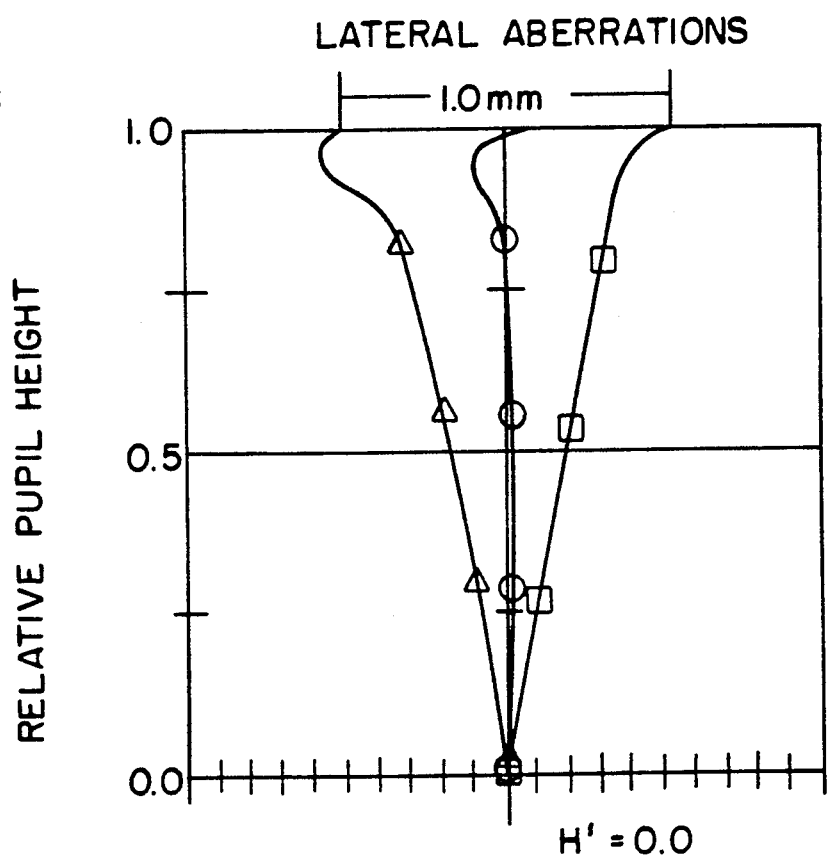
FIGS. 8 through 10 show the spherical aberrations of the lens systems of FIGS. 2 through 4, respectively.
Figure 9:
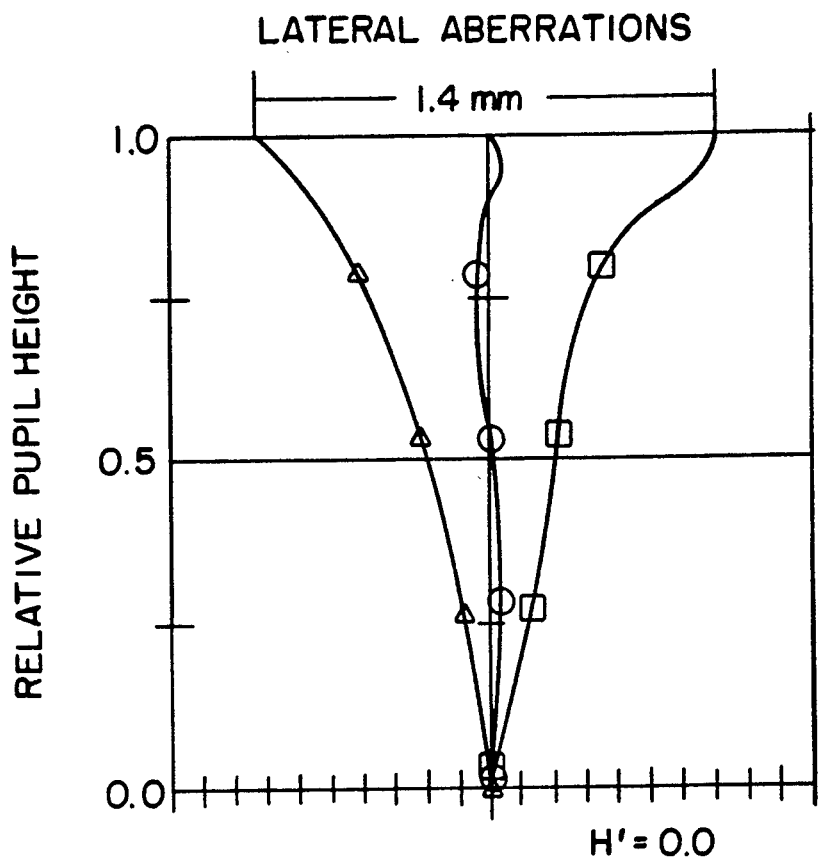
Figure 10:
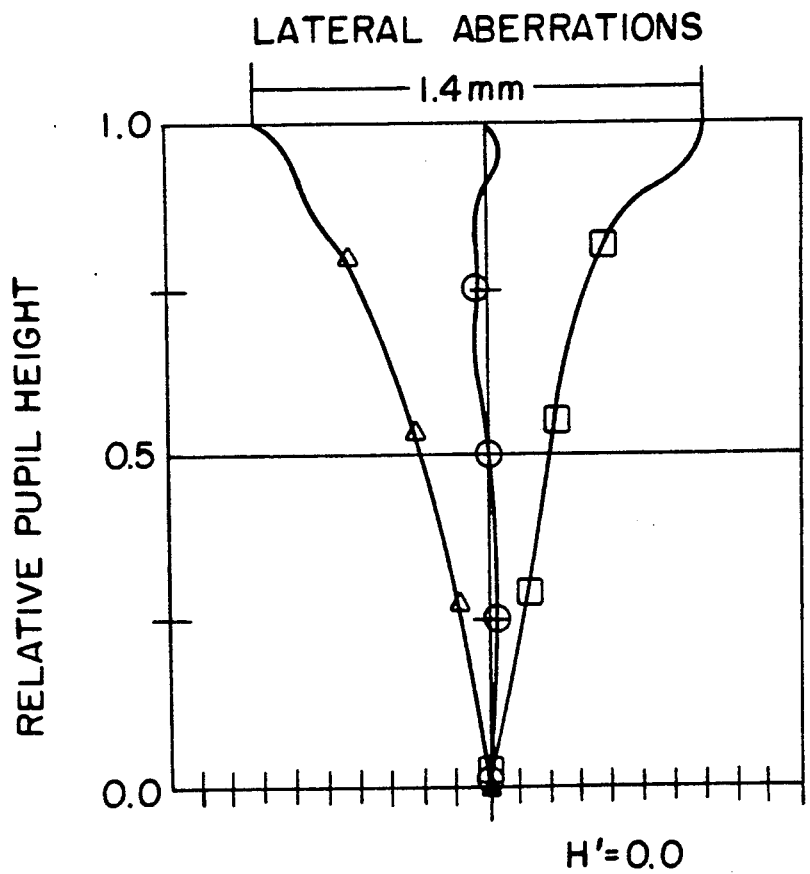

FIGS. 8 through 10 show the spherical aberrations of the lens systems of FIGS. 2 through 4, respectively. Each of these lens systems is constructed in accordance with the invention, i.e., each of them includes a high dispersion first lens element which is positive on axis and negative in the vicinity of its clear aperture, and thus as with the lens system of FIG. 1, each of them exhibits a relatively low level of spherochromatism.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| LENS SYSTEM PRESCRIPTION | | | | | | |
|---|---|---|---|---|---|---|
| SN | RADIUS | THICKNESS | $N_e$ | $V_e$ | CLR. AP. | LENS NO. |
| 1 | 77.1396 | 8.00000 | 1.59495 | 30.7 | 83.56 | L1 |
| 2 | 151.1157 | 8.74102 | | | 76.55 | |
| 3 | −131.2703 | 10.00000 | 1.49354 | 57.3 | 76.38 | L2 |
| 4 | −111.2819 | −3.30000 | | | 75.26 | |
| 5 | ∞ | 3.80000 | | | 71.62 | |
| 6 | 69.0000 | 20.00000 | 1.64129 | 55.2 | 73.56 | L3 |
| 7 | −166.1969 | 0.50000 | | | 71.44 | |
| 8 | −153.3330 | 6.00000 | 1.49354 | 57.3 | 67.43 | L4 |
| 9 | −289.5144 | 2.19659 | | | 62.73 | |
| 10 | ∞ | 4.00000 | | | 59.37 | |
| 11 | −270.5104 | 7.00000 | 1.49354 | 57.3 | 59.55 | L5 |
| 12 | −86.4218 | 23.43313 | | | 61.68 | |
| 13 | −40.6238 | 4.00000 | 1.49534 | 57.3 | 64.76 | L6 |
| 14 | −38.7000 | 9.00000 | 1.43300 | 50.0 | 70.80 | |
| 15 | ∞ | 13.10000 | 1.56600 | 50.0 | 130.00 | |
| 16 | −350.0000 | −0.00183 | | | 130.00 | |
| ASPHERICAL SURFACE DATA | | | | | | |
| SN | AD | AE | AF | AG | AH | AI |

TABLE 1-continued

| | | | | | |
|---|---|---|---|---|---|
| 1 | −2.2136E-06 | −9.9619E-10 | 8.9552E-14 | 8.7857E-17 | 1.5777E-20 | −6.3718E-24 |
| 2 | −1.0042E-06 | 5.4612E-10 | −1.0657E-13 | 1.0915E-15 | −7.8015E-19 | 1.7184E-22 |
| 3 | 1.3087E-06 | 4.9028E-10 | −7.0885E-14 | −3.4999E-17 | −1.1800E-21 | −1.5320E-24 |
| 4 | 4.0901E-07 | −7.5018E-10 | 1.2274E-13 | 2.1116E-17 | 9.4434E-21 | −7.3495E-24 |
| 8 | 2.1083E-06 | 1.0001E-09 | −1.2480E-12 | 3.7184E-16 | 6.9433E-19 | −4.9202E-22 |
| 9 | 2.5385E-06 | −5.6709E-10 | 2.2261E-13 | −6.2248E-16 | −7.4441E-19 | 4.7062E-22 |
| 11 | −6.3376E-07 | −3.2991E-09 | 1.0634E-11 | −1.6772E-14 | 1.0752E-17 | −2.0426E-21 |
| 12 | −4.5920E-09 | 2.1818E-09 | −5.1313E-12 | 9.4860E-15 | −8.6088E-18 | 3.6857E-21 |
| 13 | −9.5364E-06 | 2.2496E-08 | −4.3195E-11 | 3.8160E-14 | −1.2814E-17 | −1.0806E-21 |

ZOOM SPACINGS

| ZP SN | 12 | EFL | MAG | FINITE f/NO | HFOV |
|---|---|---|---|---|---|
| 1 | 23.922 | 66.4406 | −0.1267 | 1.13 | 41.8° |
| 2 | 23.433 | 66.7548 | −0.1128 | 1.12 | 41.8° |

TABLE 2

LENS SYSTEM PRESCRIPTION

| SN | RADIUS | THICKNESS | $N_e$ | $V_e$ | CLR. AP. | LENS NO. |
|---|---|---|---|---|---|---|
| 1 | 77.2440 | 8.00000 | 1.59495 | 30.7 | 81.24 | L1 |
| 2 | 141.1455 | 8.54490 | | | 74.67 | |
| 3 | −137.4052 | 10.00000 | 1.49354 | 57.3 | 74.44 | L2 |
| 4 | −117.3871 | −3.30000 | | | 73.38 | |
| 5 | ∞ | 3.80000 | | | 71.52 | |
| 6 | 69.0000 | 20.00000 | 1.64129 | 55.2 | 72.60 | L3 |
| 7 | −166.7425 | 0.50000 | | | 70.36 | |
| 8 | −157.4535 | 6.00000 | 1.49354 | 57.3 | 66.58 | L4 |
| 9 | −264.4856 | 2.06896 | | | 62.80 | |
| 10 | ∞ | 4.00000 | | | 60.30 | |
| 11 | −271.4059 | 7.00000 | 1.49354 | 57.3 | 60.41 | L5 |
| 12 | −86.5622 | 23.44999 | | | 62.32 | |
| 13 | −41.2206 | 4.00000 | 1.49354 | 57.3 | 65.41 | L6 |
| 14 | −38.7000 | 9.00000 | 1.43300 | 50.0 | 71.45 | |
| 15 | ∞ | 13.10000 | 1.56600 | 50.0 | 121.16 | |
| 16 | −350.0000 | 0.00089 | | | 130.45 | |

ASPHERICAL SURFACE DATA

| SN | AD | AE | AF | AG | AH | AI |
|---|---|---|---|---|---|---|
| 1 | −2.2298E-06 | −9.9587E-10 | 8.9925E-14 | 8.8128E-17 | 1.5957E-20 | −6.2014E-24 |
| 2 | −1.0050E-06 | 5.4724E-10 | −1.0328E-13 | 1.0912E-15 | −7.8095E-19 | 1.7139E-22 |
| 3 | 1.2975E-06 | 4.6849E-10 | −6.8257E-14 | −3.0102E-17 | −6.0051E-22 | −2.9973E-24 |
| 4 | 3.9001E-07 | −7.5235E-10 | 1.1379E-13 | 1.9801E-17 | 1.1792E-20 | −5.4463E-24 |
| 8 | 2.0724E-06 | 1.0003E-09 | −1.2379E-12 | 3.7628E-16 | 6.9378E-19 | −4.9507E-22 |
| 9 | 2.5733E-06 | −5.7329E-10 | 2.1886E-13 | −6.1474E-16 | −7.3049E-19 | 4.8423E-22 |
| 11 | −6.0886E-07 | −3.2887E-09 | 1.0661E-11 | −1.6754E-14 | −1.0759E-17 | −2.0292E-21 |
| 12 | −1.3415E-07 | 2.2549E-09 | −5.1248E-12 | 9.4682E-15 | −8.6153E-18 | 3.7008E-21 |
| 13 | −9.9693E-06 | 2.3092E-08 | −4.3320E-11 | 3.7847E-14 | −1.2863E-17 | −8.4506E-22 |

ZOOM SPACINGS

| ZP SN | 12 | EFL | MAG | FINITE f/NO | HFOV |
|---|---|---|---|---|---|
| 1 | 23.880 | 67.1008 | −0.1079 | 1.13 | 43.6° |
| 2 | 23.450 | 67.3756 | −0.0953 | 1.12 | 43.6° |

TABLE 3

LENS SYSTEM PRESCRIPTION

| SN | RADIUS | THICKNESS | $N_e$ | $V_e$ | CLR. AP. | LENS NO. |
|---|---|---|---|---|---|---|
| 1 | 86.9832 | 8.00000 | 1.59495 | 30.7 | 94.63 | L1 |
| 2 | 109.3980 | 12.46327 | | | 83.67 | |
| 3 | −95.4922 | 8.00000 | 1.49354 | 57.3 | 83.55 | L2 |
| 4 | −101.8439 | 1.00000 | | | 80.43 | |
| 5 | 75.6000 | 20.00000 | 1.64129 | 55.2 | 87.08 | L3 |
| 6 | −550.0000 | 1.00000 | | | 85.69 | |
| 7 | 230.0433 | 13.00000 | 1.49354 | 57.3 | 77.92 | L4 |
| 8 | −819.8896 | 10.83765 | | | 73.58 | |
| 9 | 42826.0128 | 8.00000 | 1.53111 | 46.5 | 67.19 | L5 |
| 10 | −123.6317 | 25.43539 | | | 67.72 | |
| 11 | −43.9737 | 4.00000 | 1.53111 | 46.5 | 71.11 | L6 |
| 12 | −42.7000 | 9.00000 | 1.43300 | 50.0 | 76.80 | |
| 13 | ∞ | 14.60000 | 1.56600 | 50.0 | 125.00 | |
| 14 | −350.0000 | −0.00012 | | | 135.00 | |

ASPHERICAL SURFACE DATA

| SN | AD | AE | AF | AG | AH | AI |
|---|---|---|---|---|---|---|
| 1 | −9.4237E-07 | −5.4767E-10 | 4.4764E-14 | 1.5750E-17 | 2.9220E-21 | 4.2365E-24 |
| 2 | −3.4200E-07 | −1.7914E-11 | −6.4461E-13 | 1.1749E-15 | −6.5621E-19 | 1.2916E-22 |
| 3 | 1.2097E-06 | 8.3622E-10 | −8.8810E-14 | 1.4333E-17 | −1.5040E-20 | −3.6486E-23 |
| 4 | 1.8497E-06 | 2.6152E-10 | 4.1623E-13 | −3.0301E-16 | −4.8279E-20 | 2.1159E-23 |

TABLE 3-continued

| | | | | | | |
|---|---|---|---|---|---|---|
| 7 | 1.7496E-06 | 7.2010E-10 | −2.4935E-13 | 2.4966E-17 | 1.0414E-19 | −2.1502E-23 |
| 8 | 4.6071E-07 | 3.2424E-10 | 2.1890E-13 | −1.2800E-16 | 1.7630E-20 | 2.0723E-24 |
| 9 | −1.2725E-06 | −4.2816E-09 | 1.0264E-11 | −1.5215E-14 | 1.0957E-17 | −2.7302E-21 |
| 10 | −1.0439E-06 | 1.7912E-09 | −5.7694E-12 | 8.9055E-15 | −6.8118E-18 | 2.4464E-21 |
| 11 | −6.6140E-06 | 1.5058E-08 | −2.8025E-11 | 2.7886E-14 | −1.3928E-17 | 2.4787E-21 |

| EFL | MAG | FINITE f/NO | HFOV |
|---|---|---|---|
| 74.8006 | −0.1073 | 1.09 | 39.9° |

TABLE 4

LENS SYSTEM PRESCRIPTION

| SN | RADIUS | THICKNESS | $N_e$ | $V_e$ | CLR. AP. | LENS NO. |
|---|---|---|---|---|---|---|
| 1 | 86.6434 | 8.00000 | 1.59495 | 30.7 | 93.91 | L1 |
| 2 | 111.9535 | 12.30686 | | | 83.28 | |
| 3 | −94.8971 | 8.00000 | 1.49354 | 57.3 | 83.16 | L2 |
| 4 | −100.3526 | 1.00000 | | | 79.64 | |
| 5 | 75.6000 | 19.00000 | 1.64129 | 55.2 | 86.94 | L3 |
| 6 | −550.0000 | 1.00000 | | | 85.83 | |
| 7 | 268.7314 | 13.00000 | 1.49354 | 57.3 | 78.24 | L4 |
| 8 | −892.9786 | 10.81457 | | | 73.45 | |
| 9 | −3442.9641 | 8.00000 | 1.53111 | 46.5 | 67.31 | L5 |
| 10 | −115.4714 | 25.80300 | | | 67.81 | |
| 11 | −44.7422 | 4.00000 | 1.53111 | 46.5 | 71.54 | L6 |
| 12 | −42.7000 | 9.00000 | 1.43300 | 50.0 | 76.98 | |
| 13 | ∞ | 14.60000 | 1.56600 | 50.0 | 122.88 | |
| 14 | −350.0000 | −0.00025 | | | 132.91 | |

ASPHERICAL SURFACE DATA

| SN | AD | AE | AF | AG | AH | AI |
|---|---|---|---|---|---|---|
| 1 | −9.5997E-07 | −5.5010E-10 | 4.5017E-14 | 1.6289E-17 | 3.2925E-21 | 4.4717E-24 |
| 2 | −3.5703E-07 | −5.5422E-12 | −6.4788E-13 | 1.1737E-15 | −6.5545E-19 | 1.3011E-22 |
| 3 | 1.1949E-06 | 8.2429E-10 | −8.8718E-14 | 1.4705E-17 | −1.5112E-20 | −3.6520E-23 |
| 4 | 1.8222E-06 | 2.6373E-10 | 4.1227E-13 | −3.0488E-16 | −4.8246E-20 | 2.1686E-23 |
| 7 | 1.7833E-06 | 6.8168E-10 | −2.5311E-13 | 2.8130E-17 | 1.0473E-19 | −2.5513E-23 |
| 8 | 5.2401E-07 | 3.4767E-10 | 1.9931E-13 | −1.4249E-16 | 2.0854E-20 | 1.4086E-23 |
| 9 | −1.2382E-06 | −4.2678E-09 | 1.0285E-11 | −1.5206E-14 | 1.0972E-17 | −2.7159E-21 |
| 10 | −1.0650E-06 | 1.8082E-09 | −5.7506E-12 | 8.9174E-15 | −6.8123E-18 | 2.4529E-21 |
| 11 | −6.5454E-06 | 1.4728E-08 | −2.7786E-11 | 2.7865E-14 | −1.3998E-17 | 2.5310E-21 |

| EFL | MAG | FINITE f/NO | HFOV |
|---|---|---|---|
| 74.9064 | −0.1073 | 1.09 | 39.9° |

TABLE 5

LENS SYSTEM PRESCRIPTION

| SN | RADIUS | THICKNESS | $N_e$ | $V_e$ | CLR. AP. | LENS NO. |
|---|---|---|---|---|---|---|
| 1 | 78.1900 | 8.00000 | 1.49354 | 57.3 | 83.91 | L1 |
| 2 | 116.7615 | 9.89379 | | | 73.79 | |
| 3 | −163.1777 | 6.00000 | 1.49354 | 57.3 | 73.42 | L2 |
| 4 | −136.3949 | −1.00000 | | | 71.85 | |
| 5 | ∞ | 2.00000 | | | 71.23 | |
| 6 | 69.0000 | 23.00000 | 1.64129 | 55.2 | 78.32 | L3 |
| 7 | −119.5329 | 1.00000 | | | 77.20 | |
| 8 | −275.9568 | 6.00000 | 1.49354 | 57.3 | 66.89 | L4 |
| 9 | −534.2955 | 2.23492 | | | 62.13 | |
| 10 | ∞ | 4.47761 | | | 60.45 | |
| 11 | −201.2641 | 7.00000 | 1.49354 | 57.3 | 59.63 | L5 |
| 12 | −78.7904 | 23.10445 | | | 60.89 | |
| 13 | −38.1463 | 4.00000 | 1.49354 | 57.3 | 64.07 | L6 |
| 14 | −38.5000 | 9.00000 | 1.43300 | 50.0 | 70.35 | |
| 15 | ∞ | 13.10000 | 1.56600 | 50.0 | 135.00 | |
| 16 | −350.0000 | 0.00117 | | | 135.00 | |

ASPHERICAL SURFACE DATA

| SN | AD | AE | AF | AG | AH | AI |
|---|---|---|---|---|---|---|
| 1 | −2.0109E-06 | −8.2597E-10 | 1.2170E-13 | 7.5550E-17 | 8.7298E-21 | −5.9445E-24 |
| 2 | −2.9455E-07 | 6.9903E-10 | −3.0506E-13 | 1.0098E-15 | −7.8244E-19 | 2.1627E-22 |
| 3 | 1.4267E-06 | 2.1508E-10 | −7.5383E-14 | −5.8333E-17 | −3.8431E-21 | 9.0962E-24 |
| 4 | 1.0641E-06 | −4.2445E-10 | 2.6191E-13 | −3.2967E-19 | −2.5491E-20 | 2.1725E-23 |
| 8 | 2.4624E-06 | 1.4061E-09 | −8.5342E-13 | 2.0272E-16 | 4.4745E-19 | −1.7132E-22 |
| 9 | 2.1202E-06 | 2.3803E-10 | 3.2076E-13 | −5.5872E-16 | −5.6202E-19 | 5.4357E-22 |
| 11 | −1.2900E-06 | −3.3311E-09 | 1.0466E-11 | −1.5627E-14 | 1.1768E-17 | −3.1093E-21 |
| 12 | −3.0486E-07 | 1.8599E-09 | −4.2750E-12 | 9.7213E-15 | −8.4482E-18 | 3.7316E-21 |
| 13 | −7.9712E-06 | 2.0006E-08 | −4.0203E-11 | 3.7811E-14 | −1.3403E-17 | −1.2379E-21 |

ZOOM SPACINGS

| ZP | SN | 12 | EFL | MAG | FINITE f/NO | HFOV |
|---|---|---|---|---|---|---|

TABLE 5-continued

| | | | | | |
|---|---|---|---|---|---|
| 1 | 23.622 | 66.3087 | −0.1267 | 1.13 | 41.8° |
| 2 | 23.104 | 66.6723 | −0.1128 | 1.12 | 41.8° |

TABLE 6

| | | Focal Lengths* | | | | | | |
|---|---|---|---|---|---|---|---|---|
| | $f_1$ | $\phi_{CA}/\phi_1$** | $f_2$ | $f_3$ | $f_4$ | $f_5$ | $f_6$ | $f_0$ (mm) |
| Ex. 1 | 254.59 | −10.92 | 1270.7 | 78.64 | −670.25 | 254.12 | 981.46 | 66.44 |
| Ex. 2 | 273.98 | −11.75 | 1401.3 | 78.71 | −803.23 | 254.34 | 841.20 | 67.10 |
| Ex. 3 | 629.72 | −14.37 | −5314.1 | 104.95 | 365.48 | 232.12 | 1328.50 | 74.80 |
| Ex. 4 | 576.23 | −13.35 | −6862.0 | 104.89 | 420.10 | 224.77 | 1048.80 | 74.91 |

*All focal lengths are measured in air.
**$\phi_{CA}/\phi_1 = (C_{1CA}-C_{2CA})/(C_{1A}-C_{2A})$ where $C_{1CA}$ and $C_{2CA}$ are the curvatures of S1 and S2 at the clear aperture and $C_{1A}$ and $C_{2A}$ are the curvatures of those surfaces at the optical axis.

TABLE 7

| | Unit Powers* | | | |
|---|---|---|---|---|
| | $f_{U1}$ | $f_{U2}$ | $f_{CR}$ | $f_{U3}$ | $f_0$ (mm) |
| Example 1 | 220.23 | 78.64 | 389.05 | −116.08 | 66.44 |
| Example 2 | 237.48 | 78.71 | 357.24 | −118.42 | 67.10 |
| Example 3 | 730.58 | 104.95 | 147.61 | −128.29 | 74.80 |
| Example 4 | 644.29 | 104.89 | 151.83 | −131.67 | 74.91 |

*U1 = L1 + L2
U2 = L3
CR = L4 + L5
U3 = L6 + coupling fluid + CRT faceplate

What is claimed is:

1. A projection lens system for use with a cathode ray tube comprising in order from the system's image side:
    (a) a first lens unit comprising in order from the lens system's image side:
        (i) a first lens element having a positive power on axis and at least one aspheric surface which causes said positive power to become negative in the vicinity of the lens element's clear aperture; and
        (ii) a second lens element of weak optical power;
    (b) a second lens unit which comprises a third lens element which provides the majority of the lens system's positive optical power, the dispersion of the first lens element being greater than the dispersion of the third lens element and being greater than the dispersion of all other lens elements, if any, of the second lens unit; and
    (c) a third lens unit of negative power which is associated with the cathode ray tube during use of the lens system and which provides most of the correction for the field curvature of the lens system.

2. The projection lens system of claim 1 wherein the first lens element is composed of styrene.

3. The projection lens system of claim 1 wherein the system has a power $\phi_0$, the first lens element has an on-axis power $\phi_1$, and the ratio of $\phi_1$ to $\phi_0$ is less than about 0.3.

4. The projection lens system of claim 1 wherein $\phi_1$ is the on-axis power of the first lens element, $|\phi_{CA}|$ is the absolute value of the most negative power of the first lens element in the vicinity of its clear aperture, and the ratio of $|\phi_{CA}|$ to $\phi_1$ is greater than about 8.0.

5. The projection lens system of claim 1 wherein the second lens element is a meniscus-shaped element which is concave to the first lens element.

6. The projection lens system of claim 1 wherein the system has a power $\phi_0$, the second lens element has an on-axis power $\phi_2$, and the ratio of the absolute value of $\phi_2$ to $\phi_0$ is less than about 0.1.

7. The projection lens system of claim 1 wherein the third lens element is composed of a crown-type glass.

8. The projection lens system of claim 1 further comprising a corrector lens unit which comprises two aspheric lens elements, said corrector lens unit being located between said second and third lens units.

9. The projection lens system of claim 1 wherein the first lens element is composed of a high dispersion material and no other lens element in the system is composed of a high dispersion material.

10. A projection lens system for use with a cathode ray tube comprising in order from the system's image side:
    (a) a first lens unit having a first lens element at its image side which has a positive power on axis and at least one aspheric surface which causes said positive power to become negative in the vicinity of the lens element's clear aperture;
    (b) a second lens unit which comprises a power subunit, said power subunit providing the majority of the lens system's positive optical power and comprising at least one lens element, the dispersion of said first lens element being greater than the dispersion of the element or elements comprising the power subunit and being greater than the dispersion of all other lens elements, if any, of the second lens unit; and
    (c) a third lens unit of negative power which is associated with the cathode ray tube during use of the lens system and which provides most of the correction for the field curvature of the lens system.

11. The projection lens system of claim 10 wherein the first lens element is composed of styrene.

12. The projection lens system of claim 10 wherein the system has a power $\phi_0$, the first lens element has an on-axis power $\phi_1$, and the ratio of $\phi_1$ to $\phi_0$ is less than about 0.3.

13. The projection lens system of claim 10 wherein $\phi_1$ is the on-axis power of the first lens element, $|\phi_{CA}|$ is the absolute value of the most negative power of the first lens element in the vicinity of its clear aperture, and the ratio of $|\phi_{CA}|$ to $\phi_1$ is greater than about 8.0.

14. The projection lens system of claim 10 wherein the element or elements comprising the power subunit are composed of a crown-type glass.

15. The projection lens system of claim 10 further comprising a corrector lens unit which comprises two aspheric lens elements, said corrector lens unit being located between said second and third lens units.

16. The projection lens system of claim 10 wherein the first lens element is composed of a high dispersion material and no other lens element in the system is composed of a high dispersion material.

17. A projection lens system for use with a cathode ray tube comprising in order from the system's image side:
(a) a first lens unit comprising in order from the lens system's image side:
  (i) a first lens element composed of styrene and having a positive power on axis and at least one aspheric surface which causes said positive power to become negative in the vicinity of the lens element's clear aperture; and
  (ii) a second lens element composed of an acrylic material;
(b) a second lens unit comprising a positive lens element composed of a low dispersion glass, the dispersion of said low dispersion glass being less than the dispersion of styrene and the dispersion of all other lens elements, if any, of the second lens unit being less than the dispersion of styrene;
(c) a corrector lens unit comprising two lens elements, each composed of an acrylic material; and
(d) a third lens unit of negative power which is associated with the cathode ray tube during use of the lens system, said third lens unit comprising a lens element composed of an acrylic material.

18. The projection lens system of claim 17 wherein the system has a power $\phi_0$, the first lens element has an on-axis power $\phi_1$, and the ratio of $\phi_1$ to $\phi_0$ is less than about 0.3.

19. The projection lens system of claim 17 wherein $\phi_1$ is the on-axis power of the first lens element, $|\phi_{CA}|$ is the absolute value of the most negative power of the first lens element in the vicinity of its clear aperture, and the ratio of $|\phi_{CA}|$ to $\phi_1$ is greater than about 8.0.

20. The projection lens system of claim 17 wherein the second lens element is a meniscus-shaped element which is concave to the first lens element.

21. The projection lens system of claim 17 wherein the system has a power $\phi_0$, the second lens element has an on-axis power $\phi_2$, and the ratio of the absolute value of $\phi_2$ to $\phi_0$ is less than about 0.1.

22. A projection lens system for use with a cathode ray tube comprising in order from the system's image side:
(a) a first lens unit having a first lens element at its image side composed of a high dispersion plastic material;
(b) a second lens unit for providing the majority of the lens system's positive optical power, said second lens unit comprising one or more lens elements, the dispersion of said first lens element being greater than the dispersion of the element or elements comprising the second lens unit; and
(c) a third lens unit of negative power which is associated with the cathode ray tube during use of the lens system and which provides most of the correction for the field curvature of the lens system.

23. The projection lens system of claim 22 wherein the first lens element has a positive on-axis power.

24. The projection lens system of claim 22 wherein the first lens element has at least one aspheric surface.

25. The projection lens system of claim 24 wherein the first lens element is positive on-axis and becomes negative in the vicinity of its clear aperture.

26. The projection lens system of claim 22 wherein the first lens element is the only lens element in the system which is composed of a high dispersion plastic material.

27. The projection lens system of claim 22 wherein the high dispersion plastic material is styrene.

28. A projection television set comprising a cathode ray tube, a screen, and a projection lens system for projecting light from the cathode ray tube onto the screen to form an image, said projection lens system comprising the projection lens system of claim 1.

29. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 1.

30. A projection television set comprising a cathode ray tube, a screen, and a projection lens system for projecting light from the cathode ray tube onto the screen to form an image, said projection lens system comprising the projection lens system of claim 10.

31. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 10.

32. A projection television set comprising a cathode ray tube, a screen, and a projection lens system for projecting light from the cathode ray tube onto the screen to form an image, said projection lens system comprising the projection lens system of claim 17.

33. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 17.

34. A projection television set comprising a cathode ray tube, a screen, and a projection lens system for projecting light from the cathode ray tube onto the screen to form an image, said projection lens system comprising the projection lens system of claim 22.

35. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 22.

* * * * *